US008368695B2

(12) United States Patent
Howell et al.

(10) Patent No.: US 8,368,695 B2
(45) Date of Patent: Feb. 5, 2013

(54) TRANSFORMING OFFLINE MAPS INTO INTERACTIVE ONLINE MAPS

(75) Inventors: Jonathan R. Howell, Seattle, WA (US); Jeremy E. Elson, Kirkland, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/672,912

(22) Filed: Feb. 8, 2007

(65) Prior Publication Data

US 2008/0192053 A1 Aug. 14, 2008

(51) Int. Cl.
*G09G 5/00* (2006.01)
(52) U.S. Cl. ......... 345/427; 345/672; 345/648; 345/629
(58) Field of Classification Search .................... None
See application file for complete search history.

(56) References Cited

U.S. PATENT DOCUMENTS

| | | | | | |
|---|---|---|---|---|---|
| 5,596,494 | A * | 1/1997 | Kuo | .................................. | 702/2 |
| 5,995,110 | A * | 11/1999 | Litwinowicz | ................... | 715/848 |
| 6,219,462 | B1 * | 4/2001 | Anandan et al. | ............. | 382/294 |
| 6,249,616 | B1 * | 6/2001 | Hashimoto | ................... | 382/284 |
| 6,757,445 | B1 * | 6/2004 | Knopp | .......................... | 382/285 |
| 6,853,332 | B1 * | 2/2005 | Brookes | ......................... | 342/191 |
| 7,158,878 | B2 * | 1/2007 | Rasmussen et al. | .......... | 701/208 |
| 7,221,805 | B1 * | 5/2007 | Bachelder | ...................... | 382/255 |
| 7,283,909 | B1 * | 10/2007 | Olsen et al. | ........................ | 702/5 |
| 2001/0033291 | A1 * | 10/2001 | Scott et al. | ..................... | 345/629 |
| 2002/0054223 | A1 * | 5/2002 | Spriggs | .......................... | 348/232 |
| 2002/0061132 | A1 * | 5/2002 | Furukawa | ...................... | 382/154 |
| 2003/0190091 | A1 * | 10/2003 | Stewart et al. | ................. | 382/294 |
| 2004/0162675 | A1 * | 8/2004 | Moon et al. | ........................ | 702/3 |
| 2005/0285876 | A1 * | 12/2005 | Balaga et al. | ................... | 345/629 |
| 2006/0041375 | A1 * | 2/2006 | Witmer et al. | ................. | 701/208 |
| 2006/0133694 | A1 * | 6/2006 | Dewaele | ......................... | 382/294 |
| 2007/0013710 | A1 * | 1/2007 | Higgins et al. | ................. | 345/581 |
| 2007/0014488 | A1 * | 1/2007 | Chen et al. | ...................... | 382/294 |
| 2007/0047840 | A1 * | 3/2007 | Xu et al. | ......................... | 382/294 |
| 2007/0182762 | A1 * | 8/2007 | Wu et al. | ......................... | 345/647 |
| 2008/0052372 | A1 * | 2/2008 | Weber et al. | ................... | 709/217 |
| 2009/0027418 | A1 * | 1/2009 | Maru et al. | ..................... | 345/629 |
| 2009/0083660 | A1 * | 3/2009 | Lettau | ............................ | 715/784 |

OTHER PUBLICATIONS

James Barabas, "Sensor Planning for Novel View Generation by Camera Networks", Sep. 2006, p. 33, URL: http://dspace.mit.edu/handle/1721.1/37392.*
GCPWorks, "GCPWorks Image Registration", 1998, URL: http://web.archive.org/web/20000613022730/http://www.pcigeomatics.com/cgi-bin/pcihlp/gcpworks.*

* cited by examiner

Primary Examiner — James A Thompson
Assistant Examiner — David H Chu
(74) Attorney, Agent, or Firm — Lee & Hayes, PLLC

(57) ABSTRACT

A system is disclosed that transforms offline maps into interactive online maps. In the system, geo-coordinate relationships are determined between geo-coordinates on a source map and geo-coordinates on an online reference map. An image of the source map is transformed to form an image of a modified source map having geo-coordinates that substantially align with corresponding geo-coordinates on the reference map. Modified source tiles are formed with the image of the modified source map and displayed on a portion of the reference map.

20 Claims, 15 Drawing Sheets

TRANSFORMING OFFLINE MAPS INTO INTERACTIVE ONLINE MAPS

BACKGROUND

Various interactive renderless online map services, such as Teraserver.Com, Google.Maps.com and ViaVirtualEarth.com, provide web based global maps to client computing devices. These services offer an enormous amount of data that includes maps of global extent with detail as fine as 25 cm/pixel aerial photography. Just as importantly, users of the client computing devices can navigate (zoom and pan) throughout that data fluidly. The enormous data sets are organized so that a web browser running on the client device can easily fetch just the part of the map data the user wants to view.

Prior-generation web map services, such as MapQuest® map services, rendered at a server a new image for each change of view requested by the client computing device. This rendering step often introduced a delay of many seconds between a request for view change and the presentation of the new view. "Renderless" services simply serve pre-rendered data, eliminating this delay and providing a fast and fluid user experience.

These services provide tiling, e.g. a collection of prior generated tile shaped small images (referred to herein as "tiles"). Thus when the user changes its view of a map, these tiles can be quickly sent over the internet to the client device. Further, as the view is panned, some of these same tiles can be re-used by being displayed at different locations on a screen of the client device. If the user decides to zoom into or out of the image, tiles would be provided from the server with pre-computed tiled images that cover more detail of the image being zoomed or that provide less detail but shows more geographical area.

Interactive renderless online map services typically offer two layers of imagery: 1) road maps and/or 2) satellite or aerial photography. The client browser can switch among alternate views of any particular geographic location, because the road maps and the aerial photographs are registered to the same coordinate system. The road data is generated by rendering geographic vector information into tiles; the aerial photography is similarly rendered by transforming geo-referenced imagery from its original projection into the Mercator projection used for the online service.

A substantial effort was involved in generating image tiles for teraserver.microsoft.com, Google.Maps.com, and VirtualEarth.com. The source maps—including road data, satellite imagery, aerial photography, and annotations—had to be registered into a common projected coordinate system, despite the fact that they came from multiple sources in various projections. The companies that produced these tiles hired geographic-information-systems experts to perform this common registration. The source maps included geo-referencing information in a well-defined projection that could be mathematically transformed into the common projection coordinate system.

There are many external source maps that predate or are otherwise unrelated to renderless online services. Maps provide different content, such as hiking trails, building floor plans, or bus routes. Source maps may cover historical data, or provide fresher data or more detail than those maps available from online services. An aerial photographer may produce current higher-resolution imagery in areas for which existing online services offer outdated, no or low-quality data.

Many of these maps contain no geo-referencing information, especially if they were generated non-electronically, such as those maps created before the development of modern geographic-information-systems techniques. The maps might not even indicate the projection in which they were drawn. Absent the claimed embodiment, the task of geo-referencing these external source maps requires expertise in geographic information systems, and even with such expertise it is a difficult, tedious, and expensive task.

SUMMARY

External source maps may be integrated into an interactive renderless online map service. A tool is described with which technically unsophisticated users can produce geographically registered image tiles from arbitrary sources of map data. The geographic registration enables these image tiles to be displayed as additional layers of an interactive online map service.

Using the tool, a source map is integrated into a renderless service by transforming the source map into a set of tiles correctly aligned so that the geographic features of the source map coincide with the corresponding features in the existing layers of the online map. This integration process uses geo-referencing to discover the relationship between the source map and a known geographical coordinate system, uses reprojection to transform the image of the source map to re-project it into the Mercator coordinate system and applies that transformation piecewise, tile-by-tile, to generate a set of tiles covering the geographic extent of the source map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

DETAILED DESCRIPTION

Overview

Embodiments of a transformation system are described in which coordinates from a source map are transformed and projected on corresponding coordinates of a reference map. The modified reference map may be tiled so that images of these maps can be quickly downloaded and referenced.

While aspects of the described systems and methods for transforming maps can be implemented in any number of different computing systems, environments, television-based entertainment systems, and/or configurations, embodiments of the transformation system are described in the context of the following exemplary system architecture(s) and elements.

Exemplary Network Environment

Figure 1:
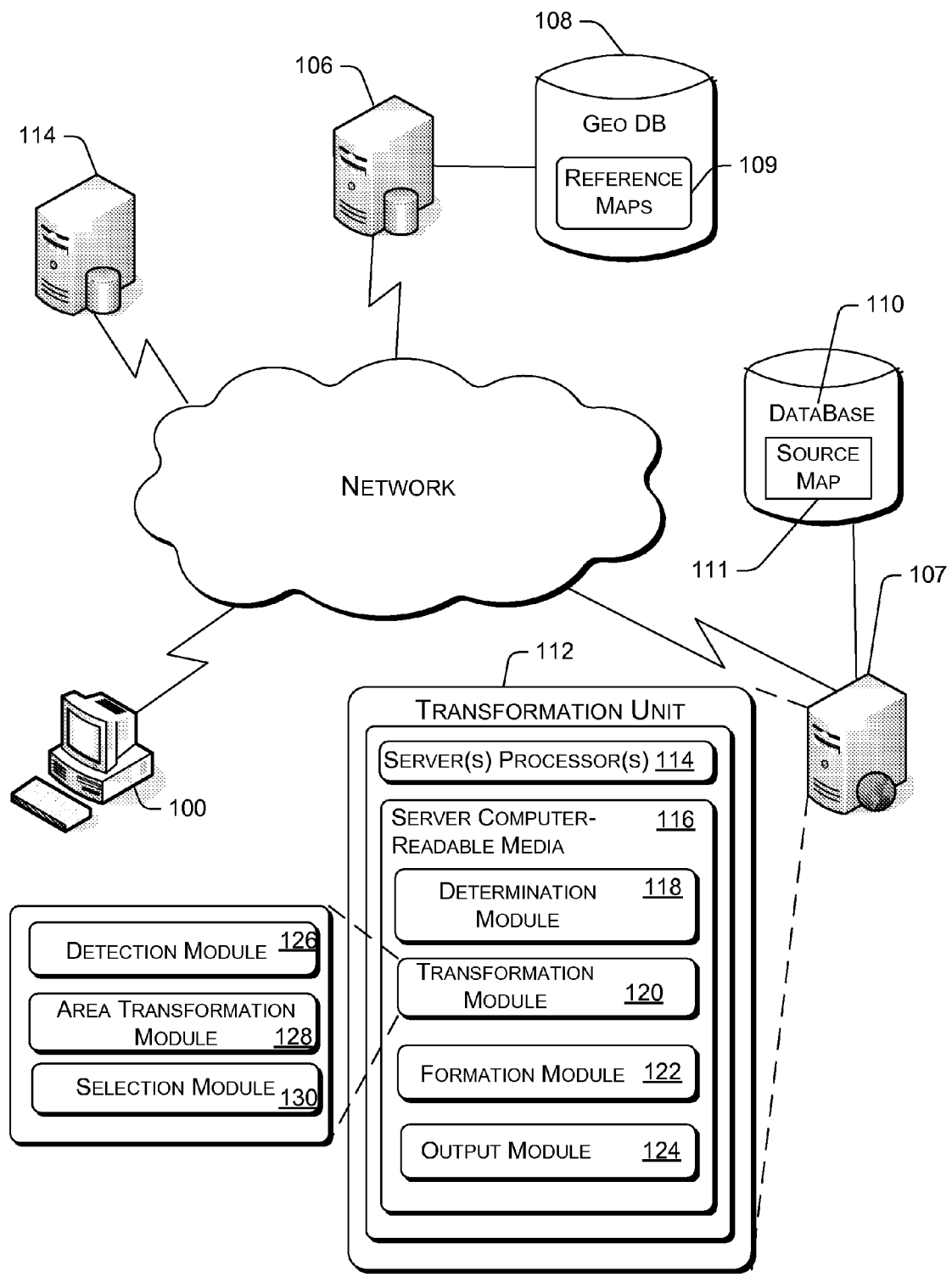
FIG. 1 illustrates an exemplary network in which a transformation system can be implemented.

FIG. 1 illustrates an exemplary network environment supporting operation of an embodiment of a transformation system. In this exemplary environment, a client device 100 is operatively linked to a network 102. Although illustrated as a client device is a desktop PC, the client device 100 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth.

Also operatively linked to the network 102 are a server 106, user computer 107 and server 114. Server 106 is further linked to a geographic database 108 that maintains on-line reference maps 109. Moreover, server 107 is further linked to a source database 110 containing source map 111. The client 100 may include a number of interfaces. Moreover, the network 102 may include the Internet, a wide area network (WAN), a local area network (LAN), or any other type of network. Although the exemplary network is shown with server 107 coupled with source database 111 comprising the source map 108, in an alternative embodiment, client device 100 can be directly coupled to source database or include a memory that stores the source map.

Server 107 includes transformation unit 112 that transforms coordinates of a source map 111 for display on a reference map 109. The transformation unit 112 includes one or more server processors 114 and memory or computer-readable media 116. Various modules may be stored in the memory 116 and executed on the processor(s) 114. As illustrated in FIG. 1, the transformation unit 112 may include determination module 118, transformation module 120, formation module 122, and output module 124.

Determination module 118 may determine geo-coordinate relationships between geo-coordinates on a source map 111 and geo-coordinates on reference map 109. The reference map 109 may have images that are formed by tiles that are each composed of many pixels.

Transformation module 120 may use the relationship between source map 111 and reference map 109. Module 120 may transform an image of the source map 111 to form a modified source map. The modified source map will have geo-coordinates that substantially align with corresponding geo-coordinates on reference map 109.

Figure 2:
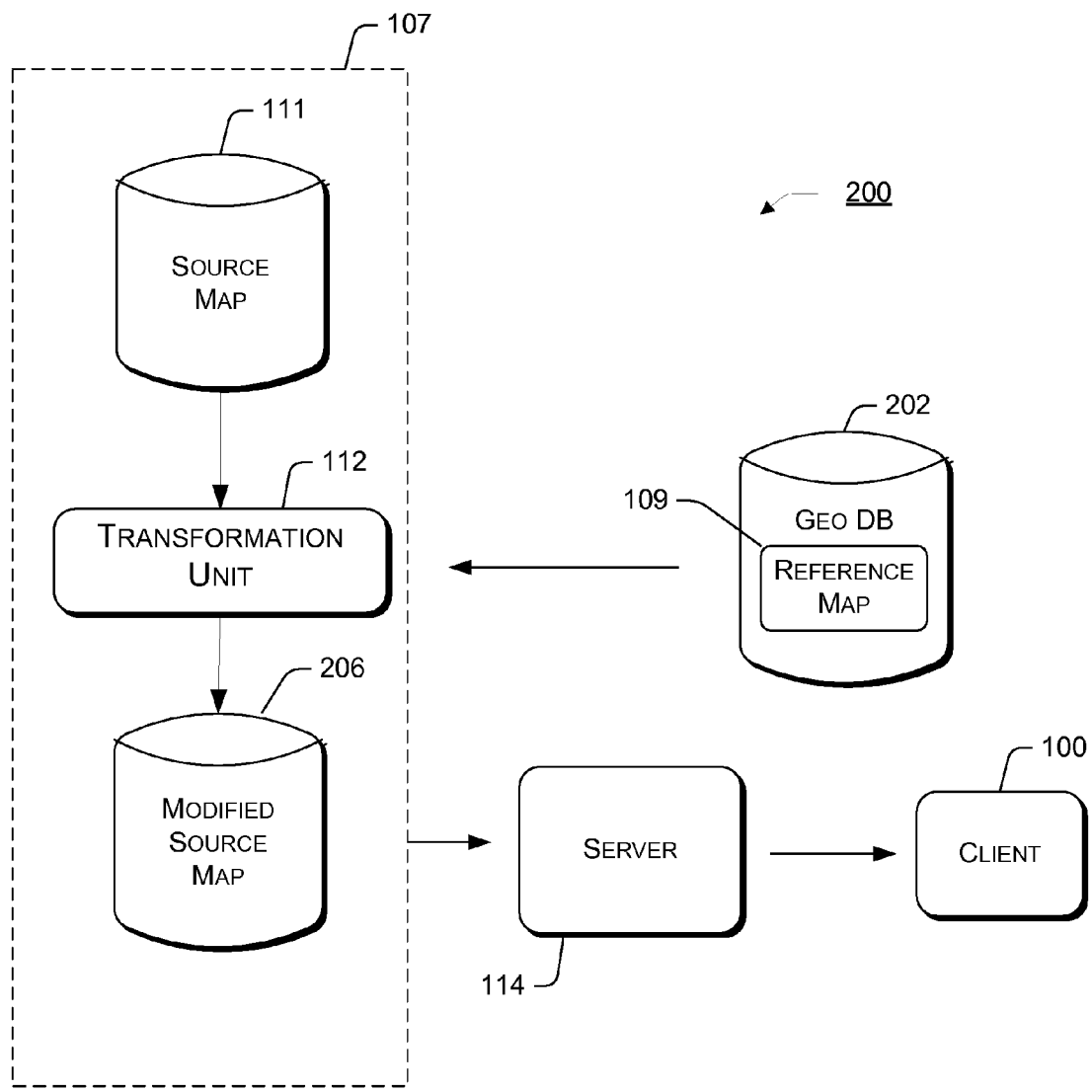
FIG. 2 illustrates an exemplary architecture of a transformation system.

Formation module 122 may form modified source tiles from the images of the modified source map 206 (FIG. 2). When formed, the modified source tiles may have geo-coordinates that align with geo-coordinates of some of the tiles that form the images of the reference map 109. An output module 124 may indicate images (by displaying or feeding the images to client 100) of a portion of the reference map 109 with the formed modified source tiles. Output module may also deliver the modified source tiles via the network to server 114 for further delivery to client 100.

In one embodiment, transformation module 120 may include a detection module 126, area transformation module 128 and selection module 130. Detection module 126 may determine a corresponding area in the source map 111 that covers an image region that defines one of the tiles forming the image in the reference map 109. Area transformation module 128 may transform coordinates of the image of the source map 111 within the corresponding area. Selection module 130 may select visibility and color for each pixel of a least one of the tiles for the modified source map based on the corresponding location within the transforming coordinates of the image of the source map 111.

In another exemplary embodiment, determination module 118 may determine a second geo-coordinate relationship between geo-coordinates on a second source map and geo-coordinates on the modified source map 206 (FIG. 2). The determination module 118 may then use the second geo-coordinate relationships to transform an image of the second source map to form a modified second source map. This modified second source map may have geo-coordinates that substantially align with corresponding geo-coordinates on the modified source map 206.

Formation module 122 may form tiles from the modified second source map. When the tiles are formed, geo-coordinates in the second source map may align with geo-coordinates in reference map 109.

The transformation system described in FIG. 1 may enable the user to easily identify correspondences visually between maps. The system may then use these correspondences to create transformed maps and form tiles for an interactive online map service. Thus the system allows a user to create interactive online maps with no geographic information system training.

Exemplary Architecture

FIG. 2 illustrates an exemplary architecture of a system in which the transformation system may be implemented. The architecture 200 includes the client 100, as described in FIG. 1, a server comprising Geo-database 202, which contains the reference maps 109 (FIG. 1), connected via a network (not shown) to user computer 107. User computer 107 may be connected via the network to Server 114. User computer 107 comprises a database containing the Source Map 111, transformation unit 112 and a Modified Source Map database 206. Details of the transformation unit 112 were described in FIG. 1. The modified source map 206 may be uploaded to server 114. Client 100 may also be connected to server 114 via the network.

In one embodiment, the Geo-database 202 is configured to store reference maps 109. The reference maps 109 may include, but are not limited, building floor plans, navigation maps, road maps, street maps, aerial maps, Virtual Earth Mercator maps developed by Microsoft, and any other diagrams that represent and provide information for a particular area.

For example, a reference map 109 may include information on a location of interest, such as a physical location or region where the location is positioned expressed in terms such as latitude, longitude, altitude, a street and/or building address, or another coordinate identifier. The reference map also may include various kinds of descriptions of the location, including short or long descriptions of the location, the proximity of the location to other locations of interest, the proximity of the location to transportation conduits, as well as other characteristics of the location. Reference maps 109 may include other forms of information about one or more locations, and the preceding list is provided by way of example, rather than by way of limitation.

The Source Map 111 may be stored in a database. Source map 111 may include, but are not limited to, aerial photographs, road data, satellite imagery, and annotations. The Modified source map 206 may also be stored in a database. The Server 114 may be operatively linked to the client 100 to provide the Modified Source Map 206.

The transformation system, as implemented on a system illustrated in FIG. 2, integrates source map 111 into a reference map 109 by transforming the source map into a set of tiles. This integration process may involve three steps: (1) georeferencing, which is the determination of the relationship between the source map and a known geographical coordinate system; (2) reprojection, which is the transformation of the image of the source map to reproject it into a well-defined projected coordinate system; and (3) tiling, which is the application of the transformation piecewise, tile-by-tile, to generate a set of tiles covering the geographic extent of the source map 111.

When a source map includes embedded georeferencing information, the source map contains a description of the projection that relates the map to geographical coordinates. In such cases, the georeferencing step of the integration process may be accomplished by an entirely automated process. Typically, embedded georeferencing information is sufficient to precisely relate the source map data to a well-defined projected coordinate system, such as a coordinate system in a reference map. From this information, an exact transformation to any other projected coordinate system may be calculated. Nevertheless, it will be appreciated that many source maps have no georeferencing information. Furthermore, their projected coordinate systems may be unknown. For these source maps, the transformation system provides graphical interfaces that allow a user to select and identify points in a region of interest on a source map that corresponds to points on the reference map. Each such correspondence identifies the global coordinate (latitude and longitude) of a point on the source map. The identified corresponding points allow the determination of the relationship between a well-defined projected coordinate system and a source map that lacks georeferencing information.

Figure 3:
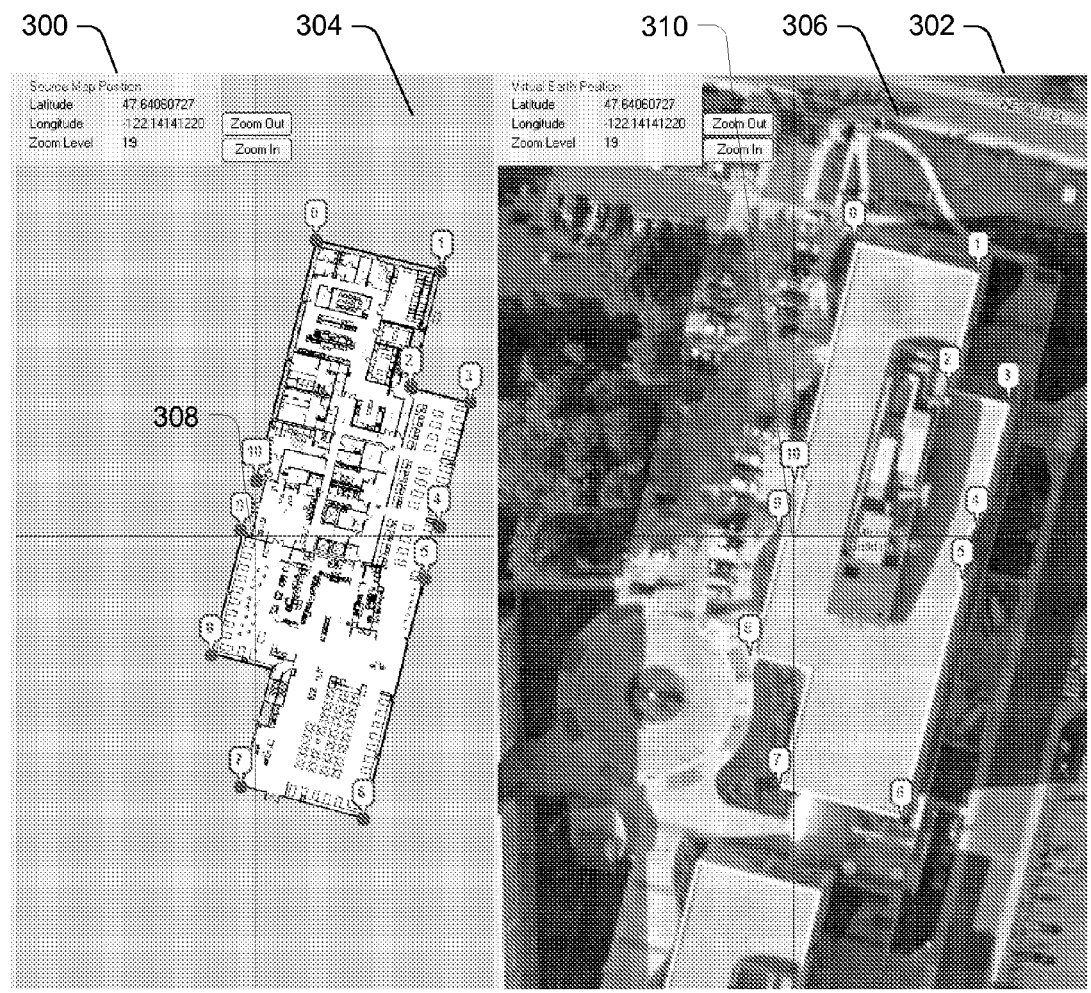
FIG. 3 illustrates an exemplary embodiment of a transformation system in which client may select regions of interest to be transformed using graphical interfaces.

FIG. 3 illustrates an exemplary embodiment of a transformation system in which a client may select regions of interest to be transformed using a graphical user interface. This exemplary embodiment further allows a user to select and identify points in the region of interest on a source map that corresponds to points on the reference map.

In this exemplary embodiment, the graphical user interface display two viewing panes, the source pane 300, and the reference pane 302. The source pane 300 displays the source map 304 in a presentation that can be readily panned and zoomed to arbitrary locations and zoom levels. The reference pane 302 displays the reference map 306 in a presentation that can be panned and zoomed independently of the source pane 300. The user employs the two panes to find a location on the source map and a location on the reference map that visually correspond to each other. For example, if the source map 304 is a floor plan of a building and the reference map 306 is an aerial photograph, the user may indicate the northwest corner of the building in the floor plan and also indicate the northwest corner of the building in the aerial photograph. In the preferred embodiment, each of the source pane 300 and the reference pane 302 includes crosshairs 308 and 310, respectively, which identify the center of the corresponding pane. The user indicates a location by panning the source map 304 and the reference map 306 to place the location under the intersection of one of the corresponding crosshairs 308 and 310. Nevertheless, it will be appreciated that other forms of location indication are also possible, such as clicking a mouse pointer on the locations in each pane.

A user repeats this process to establish a handful of correspondence points (in practice, typically between two and two dozen). In general, these correspondences may be insufficient to define an exact transformation between source map coordinates and reference map coordinates. However, they are usually sufficient for an approximate transformation when used for visual presentation of a map layer. Once georeferencing is complete, the transformation system will then proceed to the reprojection step.

Figure 4:
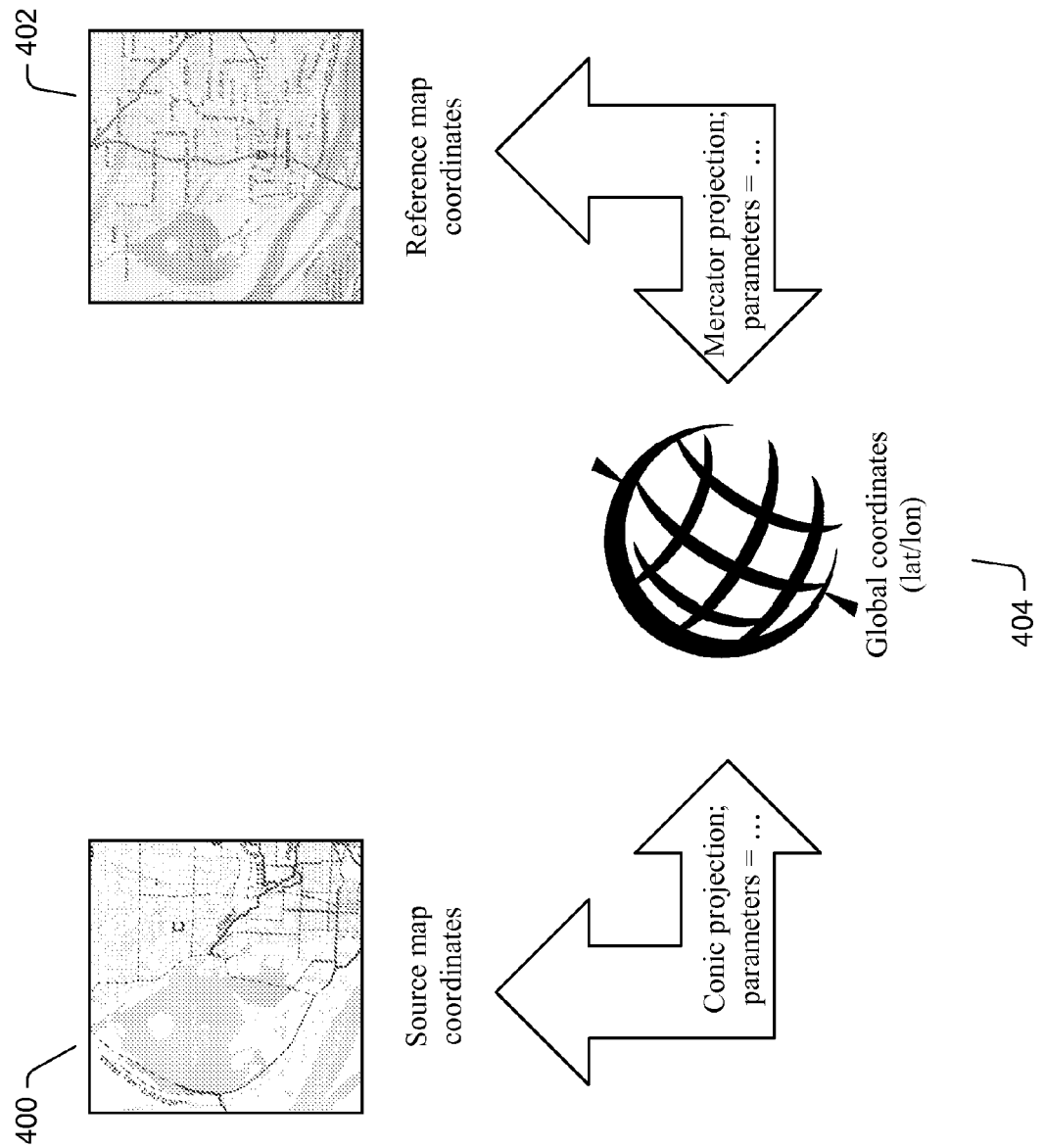
FIGS. 4, 5 and 6 illustrate exemplary embodiments of the transformation system using different re-projection techniques.
Figure 5:
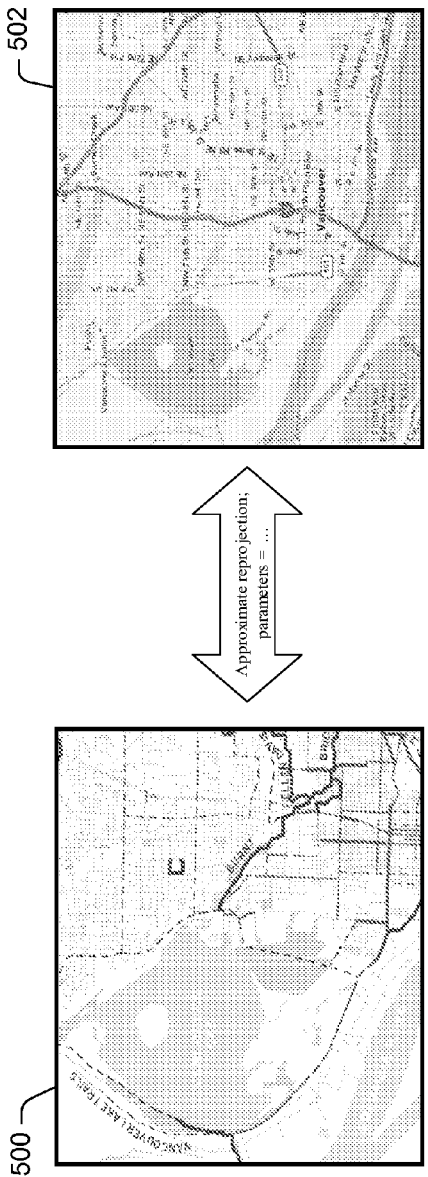

FIGS. 4 and 5 illustrate exemplary embodiments of the transformation system using different reprojection techniques. Reprojection involves generalizing a discrete set of correspondences to establish a relationship between an entire source map and global coordinates. In order to accomplish this task, a mathematical function that captures the relationship between image coordinates on the source map and image coordinates of the reference map is required.

The mathematically exact relationship between two maps may be determined by (1) the projection of each map and (2) the parameters of that projection. In the exemplary embodiment illustrated in FIG. 4, the projection of the source map 400 is conic, and the projection of the reference map 402 is Mercator. If the each of the source map 400 and the reference map 402 are known to belong to a limited class of projections, one possible approach is to try to fit various selections of projection and parameters to the user-entered correspondence data to discover a best fit. Once the fitted model for the source map projection is found, a function that captures the relationship between image coordinates on the source map 400 and image coordinates of the reference map 402 may be derived. This function allows the establishment of a relationship between the entire source map 400 and the global coordinates 404. However, the set of projections in which source maps may be drawn is large, and the process of fitting parameters to each projection is irregular and mathematically nonlinear.

An alternative technique for finding the relationship between two maps is illustrated in FIG. 5. This approach ignores precise projections. Instead, the approach uses an approximation to model the entire function that captures the relationship between the image coordinates on the source map 500 and image coordinates on the reference map 502. This technique, known as approximate reprojection, allows the source map 500 to correlate with the reference map 502.

Like a projection, an approximate reprojection is a class of functions selectable by parameters. We consider two classes of reprojections: (1) affine reprojections, including both general affine reprojections and the restricted subclass of rigid reprojections, and (2) bivariate polynomial reprojections, specifically the subclass of quadratic reprojections. The exemplary embodiment uses these classes because they enable the use of linear fitting and provide good performance in practice. It is obvious that alternative embodiments can use other classes of reprojections. The simplest would be to use polynomials of higher degree. Any other equations with arbitrary terms of the independent variables and linear coefficients would work as well.

The affine reprojection is a linear relationship between the source and reference coordinate systems, as illustrated by equations 1 and 2:

$$s_x = c_{00} r_x + c_{01} r_y + c_{02} \quad (1)$$

$$s_y = c_{10} r_x + c_{11} r_y + c_{12} \quad (2)$$

An advantage of the affine reprojection is that it has only six parameters, which can be inferred with as few as three correspondences (each correspondence provides two constraint equations, one in x and one in y.) The methods by which the parameters are inferred are discussed below.

A limitation of affine reprojection is that it preserves straight lines. If the source map is in, for example, a conic projection, then exact reprojection will change straight lines in the source map into curved lines in the reference projection. Affine reprojection may not produce this effect, and will therefore introduce errors into maps where this effect is noticeable.

A restricted subclass of affine reprojection is rigid reprojection. A rigid reprojection constrains the affine projection to only allow translation, scaling, and rotation, eliminating asymmetric scaling and skew. If both source map and reference map obey conformal projections (a common property which is true of Mercator), then the best affine projection will always be rigid.

Figure 6:
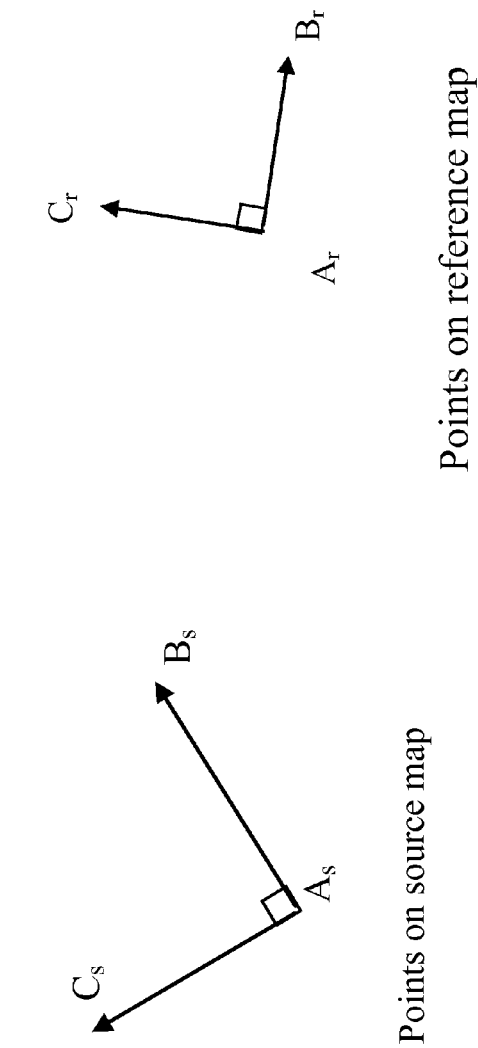

The advantage of a rigid reprojection is that it has only four degrees of freedom instead of six, and can thus be determined with only two user-provided correspondences rather than three. Through a simple mechanism, the implementation of affine reprojection may be reused to implement rigid reprojection. As described above, affine reprojection requires three correspondences, whereas rigid reprojection requires only two. The mechanism synthesizes a third correspondence and uses the resulting three correspondences to solve for the affine reprojection parameters as described above. For example in FIG. 6, for two correspondences A and B, each comprised of points $(A_s, A_r)$ and $(B_s, B_r)$ on a source map and a reference map, respectively, a point $C_s$ that forms a right isosceles triangle with As and Bs would be used to synthesize the third correspondence for the source map. Likewise, a point $C_r$ that forms a right isosceles triangle with $A_r$ and $B_r$ would be used to synthesize the third correspondence for the reference map.

To accommodate maps where the constraints of affine reprojection introduce too much error, polynomial reprojection, in particular the subclass quadratic reprojection may be used. A quadratic reprojection takes the form of the following equations 3 and 4:

$$s_x = c_{00} r_x^2 + c_{01} r_x r_y + c_{02} r_x + c_{03} r_y^2 + c_{04} r_y + c_{05} \quad (3)$$

$$s_x = c_{10} r_x^2 + c_{11} r_x r_y + c_{12} r_x + c_{13} r_y^2 + c_{14} r_y + c_{15} \quad (4)$$

By introducing terms of higher degree than the linear terms of affine reprojection, the quadratic reprojection can better approximate an exact reprojection, including some curvatures. The curvature is still not perfect, because exact reprojection generally involves trigonometric functions rather than polynomials. Nevertheless, for most applications, the quadratic reprojection is sufficiently precise that errors in the result are predominantly due to other sources.

The disadvantage of quadratic reprojection, when compared with affine reprojection is that quadratic reprojection requires six user-entered correspondence points to completely constrain its parameters. These parameters are inferred in the same manner as those for affine reprojection, as discussed below.

The equations for affine reprojection and polynomial reprojection, as discussed above, each define a mapping from reference coordinates to source coordinates, rather than the other way around. When transforming an image, this is the frequently-performed operation. However, mapping in the opposite direction is also required for some steps. Further details of mapping in the opposite direction are described in FIG. 13.

It will be appreciated that if a user provides the exact number of correspondences necessary for the reprojection (three correspondences for affine or six correspondences for quadratic), the parameter values can be determined with a simple matrix inverse. The resulting reprojection will place the specified correspondence points of the re-projected source map at the exact locations on the reference map that the user has identified.

A user may choose to provide more correspondence points than strictly necessary. There are several reasons for this: The user may be concerned about the possibility of errors in the source map; the user may have some uncertainty about which locations in the source map correspond to which locations in the reference map; or the user may be unsure of where points should be optimally placed to minimize distortion of the re-projected map. When additional correspondences are specified, it may not be possible to satisfy all correspondences simultaneously. Instead, in a preferred embodiment, the approach produces a reprojection that places the specified correspondence points of the re-projected map at locations nearby those on the reference map that the user has identified. In particular, this approach should attempt to minimize the mean squared distance between the re-projected correspondence points and the reference points. In other words, the parameters may be determined using a linear least-squares fit, which is a form of linear regression. In one embodiment, singular value decomposition (SVD) is employed to implement the fitting procedure. One ordinarily skilled in the art will readily understand that matrix inversion, linear-least-squares fitting, and SVD are all well-known linear algebra.

The transformation system, in accordance with an embodiment of the invention, can begin re-projecting a source map with as few as two correspondence points established, using rigid reprojection. When a third point is added, the application begins using a general affine reprojection. As more points are added, the approximation is improved by using parameter fitting to average out error. Once there are at least n correspondences, the transformation system automatically switches to a quadratic reprojection.

The minimum value of the threshold n is six, since that many correspondences are required to determine a quadratic reprojection. However, in a preferred embodiment, n is 7. This is because with only six points, no redundant information is present, so tiny errors can cause the application to generate a quadratic projection with undesirable distortions, whereas the same six points over-specify an affine reprojection, where the redundant constraints average out error. By disabling quadratic fitting until seven points are available, the tool ensures that its linear fitting process has a minimal amount of redundant information, which makes distorted fits occur less frequently. In an additional embodiment, a suitable mechanism may be provided to let user disable quadratic projection, so that the user can force this error-averaging behavior with seven or more points.

Figure 7:
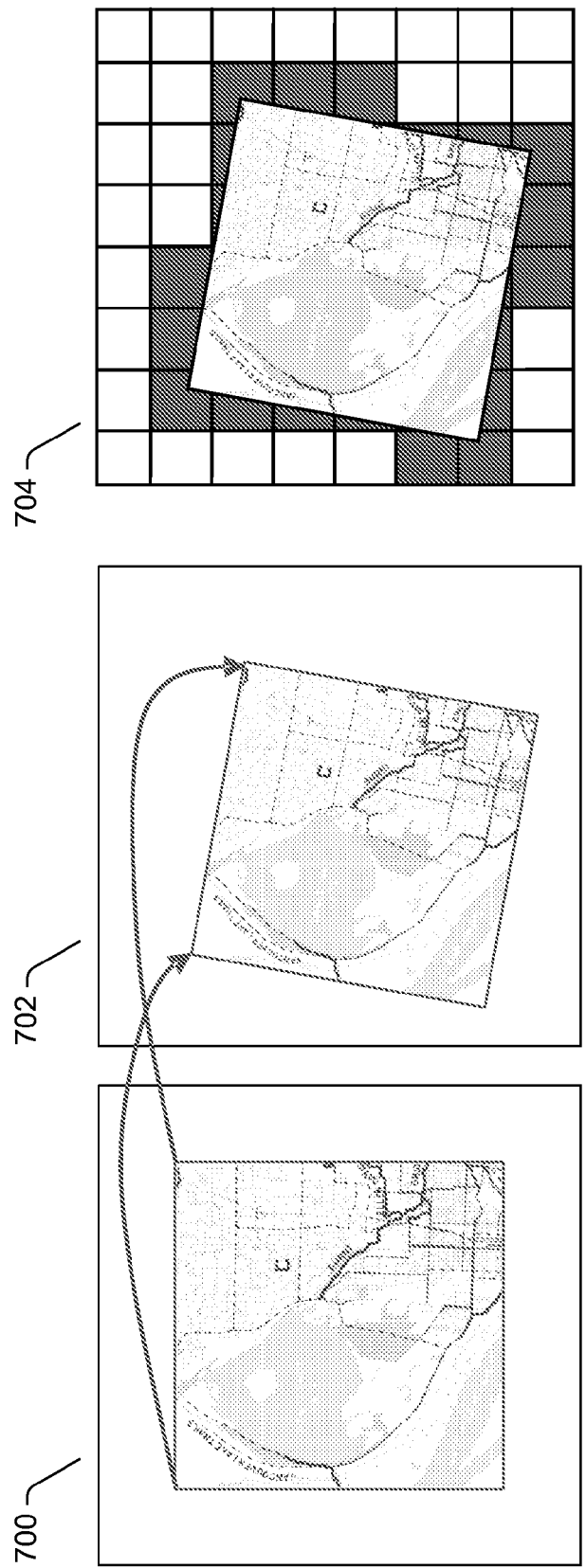
FIG. 7-9 illustrate exemplary embodiments of the transformation system using different tiling techniques.
Figure 8:
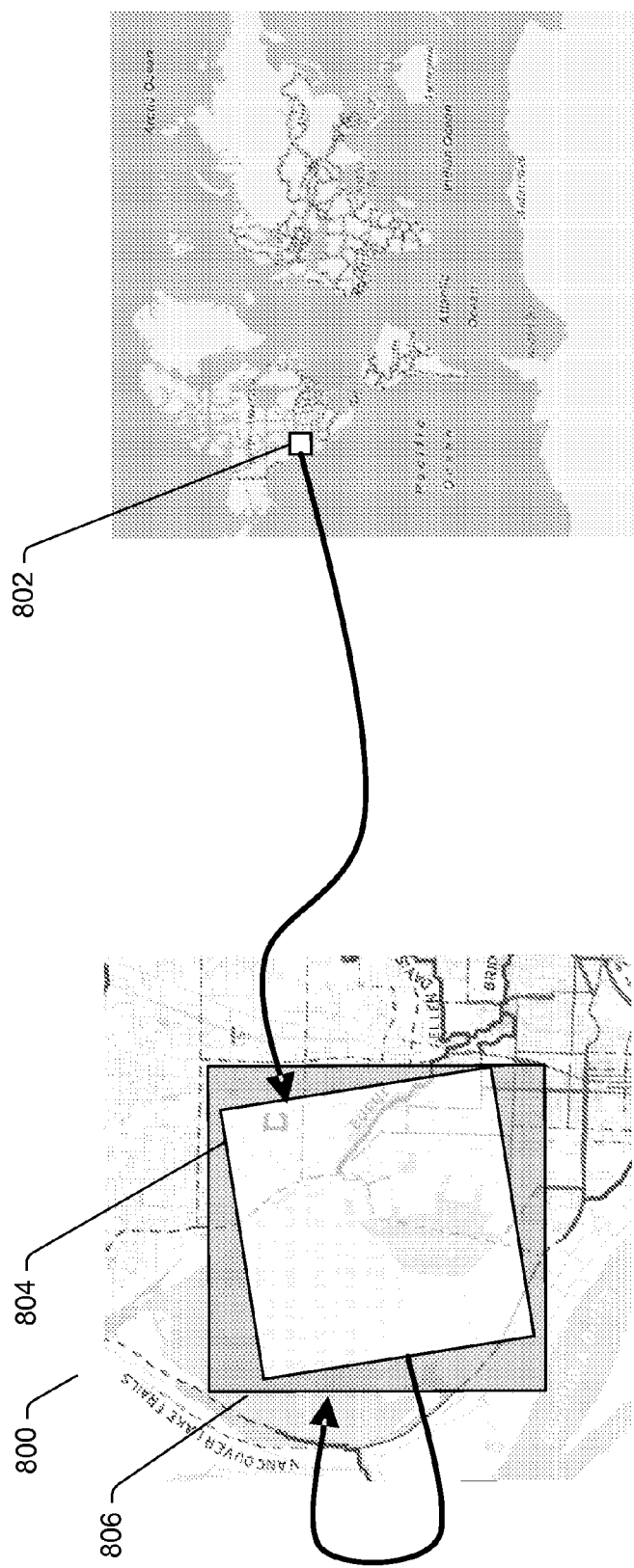
Figure 9:
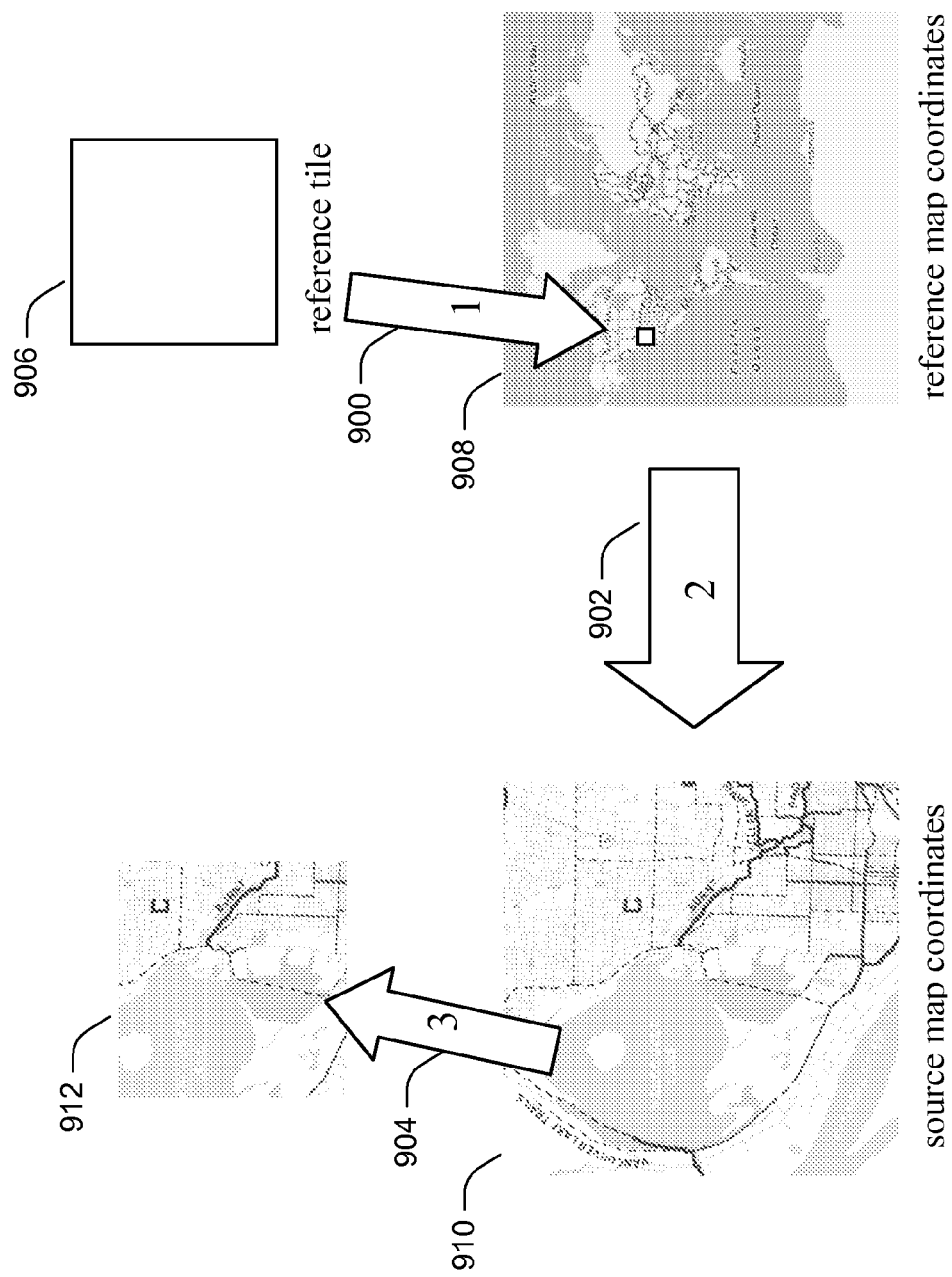

FIG. 7-9 illustrate exemplary embodiments of the transformation system using different tiling techniques. Tiling is the last of the three steps implemented by the transformation system, and involves generating tiles that cover the geographic extent of the source map. Tiling involves (1) determining geographical extent of a source map; (2) selecting region of source map to sample; and (3) transforming the source map image into modified source tiles having coordinates that align with coordinates of the tiles that form the image of the reference map.

First, as illustrated in FIG. 7, the geographic extent of a source map is determined by applying the inverse of the reprojection function to the boundaries of the source map 700. The inverse can be computer as further described herein in connection with FIG. 14.

Referring to map 702, the inverse function maps from source map coordinates to reference map coordinates. As a result, this process produces a boundary in reference coordinates that corresponds to the boundary of the source map. Illustrated in map 704, the points on the reference boundary are converted into tile coordinates to select the set of tiles that contain the entire re-projected source image.

Second, an image must be generated for each tile in the set of tiles that contain the re-projected source image. For each pixel in each such tile, a determination whether the pixel should be visible and what color it should be is made. There are several methods by which this determination can be accomplished. In one embodiment, the reprojection function may be used (along with information about the location and zoom level of the tile) to map the pixel's location to a location in the source map. Next, the area of the source map defined by the extent of the pixel is rendered, and the result of the rendering is used to assign visibility and color to the pixel. This approach can be expensive in terms of the computational cost per pixel.

In another embodiment, the entire source map at the scale dictated by the zoom level is rendered. Then, for each pixel, the location of the pixel is mapped to the appropriate location in the rendered image to determine visibility and color. This approach is computationally efficient, because it requires rendering only once, but it may be expensive in terms of the memory footprint for rendering the entire map at very high zoom levels.

However, as illustrated in FIG. 8, a determination method that is both efficient in both computation and memory is employed in a preferred embodiment. In this embodiment, for each tile to be generated, the application determines a section of the source map needed to generate the tile, and renders that part of the source map to produce a source sample. To determine the section, the boundary of the reference tile 802 in reference coordinates is transformed through the reprojection function (exact or approximate) to produce a boundary 804 in the coordinate system of the source map 800. Next, an axis-aligned bounding box 806 is drawn around the transformed tile boundary. This region is the section of the source map that is rendered into a sample image. The region is axis-aligned because most source map formats are amenable to rendering such sub-regions.

Third, as illustrated in FIG. 9, transforming the source map image via an image-warp transformation may be the result of three steps. Step 900 involves the affine transform between image coordinates of the selected reference tile 906 and the corresponding coordinate system of the reference map 908. The warp-transformation then proceeds to step 902, where the reference map coordinates are re-projected to the source map 910 (either exactly or approximately). Finally, the image-warp transformation proceeds to step 904, where the coordinate system on source map 910 is converted by affine transform to the image coordinates of the source map image sample 912. In this way, for each output pixel in the reference tile, the output coordinate is transformed from tile image coordinates to image coordinates in the source map sample. Additionally, a color is sampled from that pixel in the source image sample 912. This color determines the color of the pixel in the reference tile. In a further embodiment, standard techniques for anti-aliasing may be used to improve the quality of the warped image.

Figure 10:
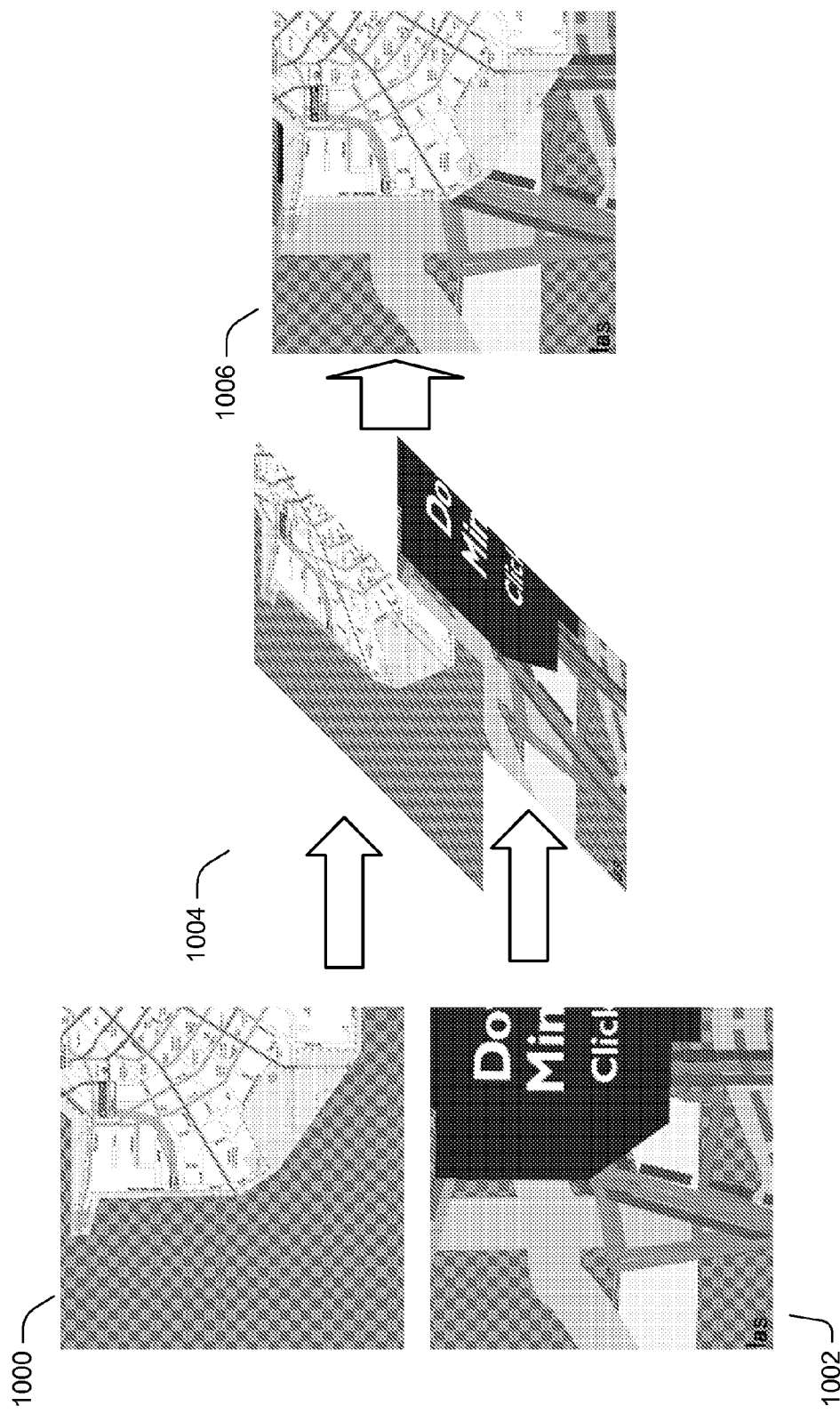
FIGS. 10-11 illustrate alternate exemplary embodiments of the transformation system in which a client can specify which regions of the source map to transform.
Figure 11:
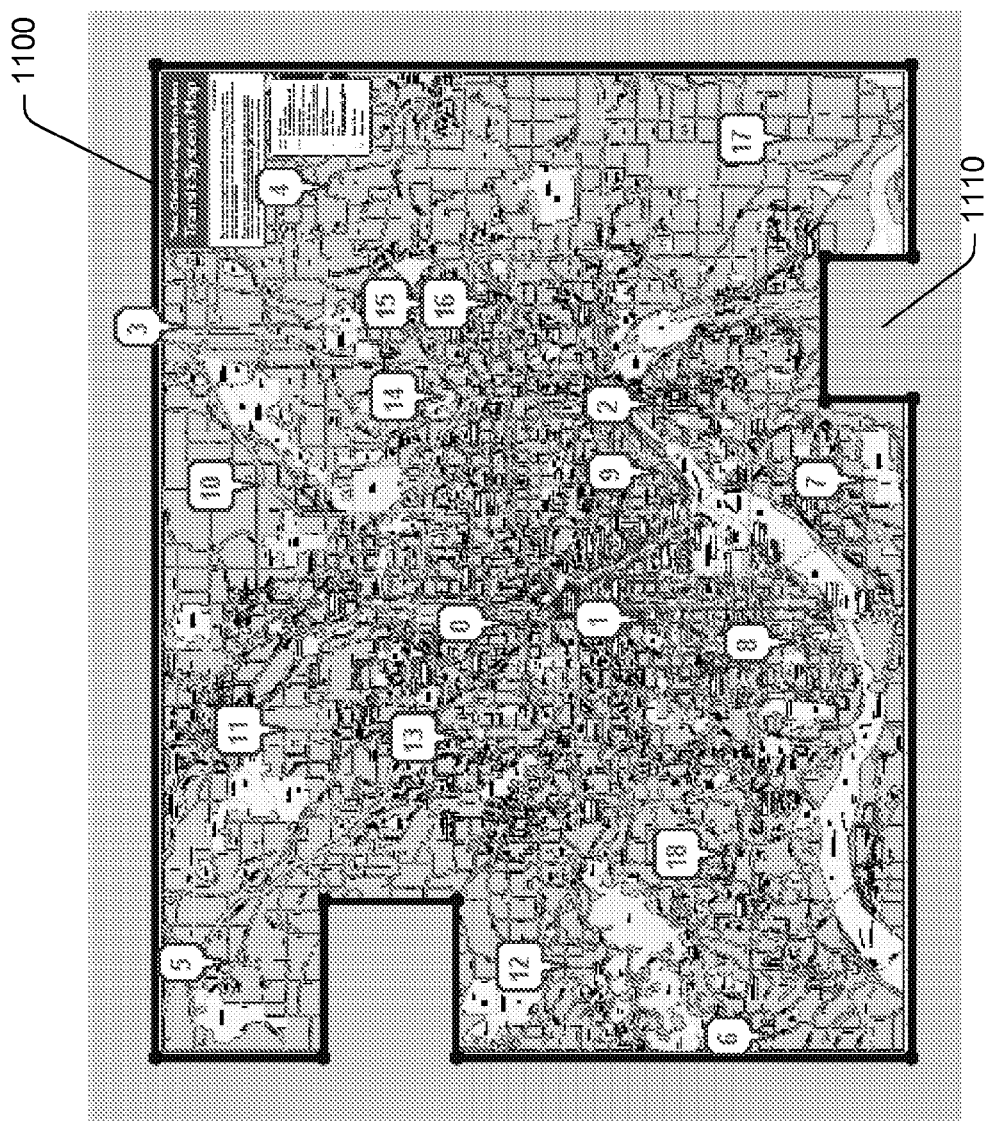

FIGS. 10-11 illustrate alternate exemplary embodiments of the transformation system having objects to enable a user to specify which regions of the source map to transform. Specifically, a user may register multiple maps that cover overlapping regions of the Earth's surface. The user may also wish to generate separate tile sets for each of the multiple maps, or alternatively, the user may wish to generate a single tile set that presents the multiple maps composited together in an order defined by the user. In an exemplary embodiment, a geo-coordinate relationship between geo-coordinates on a second source map (not shown) and geo-coordinates on the reference map 109 may be determined (for example using determination module 118). Source map 111 and the second source map may be composited together to form a single rendered tile map at points of overlapping geo-coordinates.

FIG. 10 illustrates a method that achieves these objectives. In this method, the image-warping transformation transforms an alpha (transparency) channel in addition to the usual color channels of an image. The source map is considered to be transparent at every pixel outside the bounding box 1002 of the source map image. The source map may also include information about transparency inside the bounding box 1002. The warping process of the reference tile 1000 and the bounding box 1002 preserves transparency, so that the warped tiles 1004 include transparent regions. Each final tile in the set of output tiles 1006 is produced by compositing (in the conventional way, obeying the alpha channels) all of the tiles at the same tile location from each of the source maps.

In addition to transparency derived from the bounding box of the source map, or transparency represented in the source map representation, the user may explicitly specify transparency by some other means. One way is to draw a custom region that separates the part of the source map she wishes to keep from the part that should be discarded, that is, treated as transparent. As illustrated in FIG. 11, a user has edited to bound region 1100 to remove inset drawings 1110 from the map. In an alternative embodiment, another way for a user to specify transparent regions is by selecting a specific color or colors that should be treated as transparent.

Exemplary Implementation of Transforming an Offline Source Map

Figure 12:
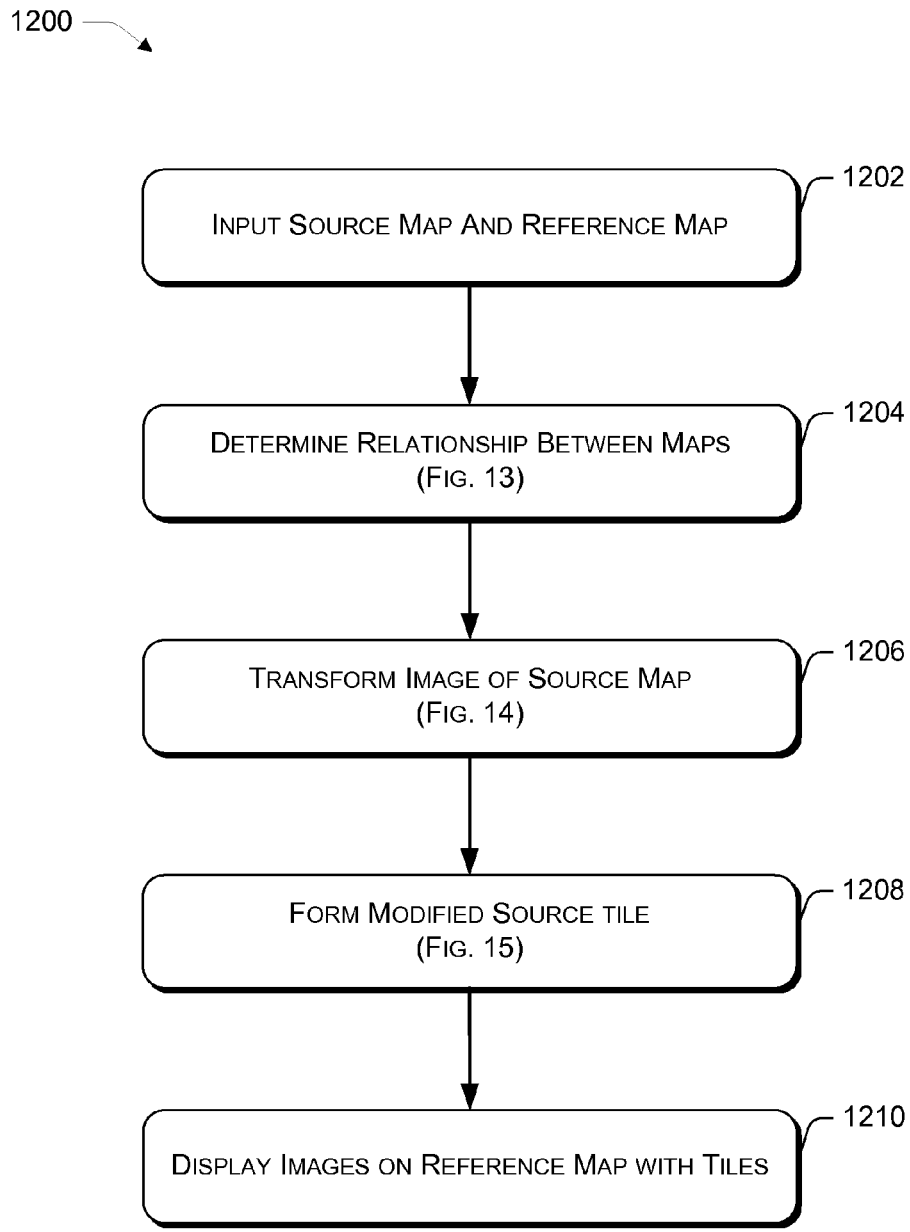
FIG. 12 illustrates an exemplary method for transforming an offline source map onto an online reference map.

FIG. 12 illustrates an exemplary method 1200 for transforming an offline source map onto an online reference map. FIG. 12 is described with reference to the exemplary elements shown in FIG. 1-11. The method 1200 can be implemented on a server or on a client device using any suitable hardware, software, firmware, or combination thereof.

At block 1202, a source map and a corresponding reference map are inputted into a transformation system. At block 1204, the relationship between the source map and the corresponding reference map is determined. This determination method is further illustrated in FIG. 13. At block 1206, the source map image is transformed. This transformation method is further illustrated in FIG. 14. At block 1208, modified source tiles are formed. This modification method is further illustrated in FIG. 15. At block 1210, images of a portion of the reference map are then display with the modified source tiles.

Figure 13:
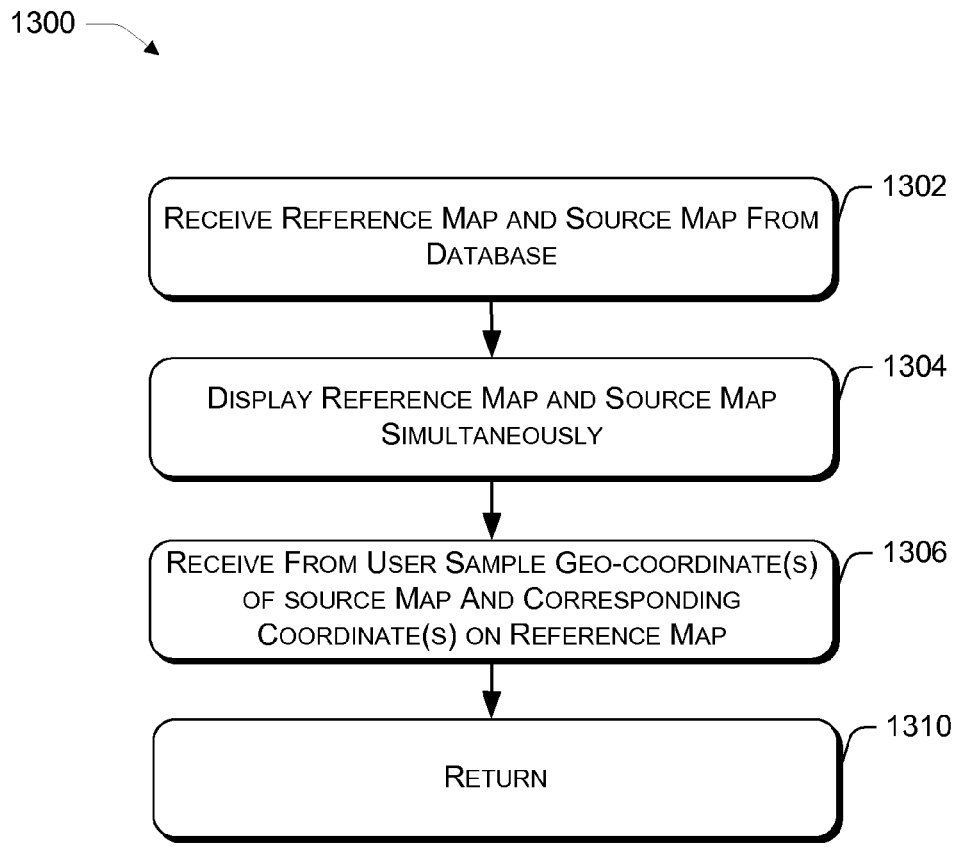
FIG. 13 illustrates an exemplary method for determine relationships between maps in which embodiments of the transformation system be implemented.

FIG. 13 illustrates an exemplary method 1300 for determining relationships between maps in which embodiments of the transformation system be implemented. FIG. 13 is described with reference to the exemplary elements shown in FIG. 1-11. At block 1302, a reference map and a source map are received from one or more databases. At block 1304, the reference map and the source map are simultaneously displayed. As described above, in one embodiment, a graphical user interface may be used to display the source map and the reference map simultaneously in two panes, and a user may employ the two panes to find a location on the source map and a location on the reference map that visually correspond to each other.

At block 1306, sample geo-coordinates of source map and corresponding coordinates on the reference map are received. As described previously, in one embodiment, a user may first indicate one or more locations on a source map using crosshairs or another appropriate interface mechanism, and then indicate one or more corresponding location on reference map using cross hairs or another appropriate interface mechanism. The method 1300 then returns to block 1206 of the exemplary method 1200 at block 1310.

Exemplary Method for Transforming a Source Image

Figure 14:
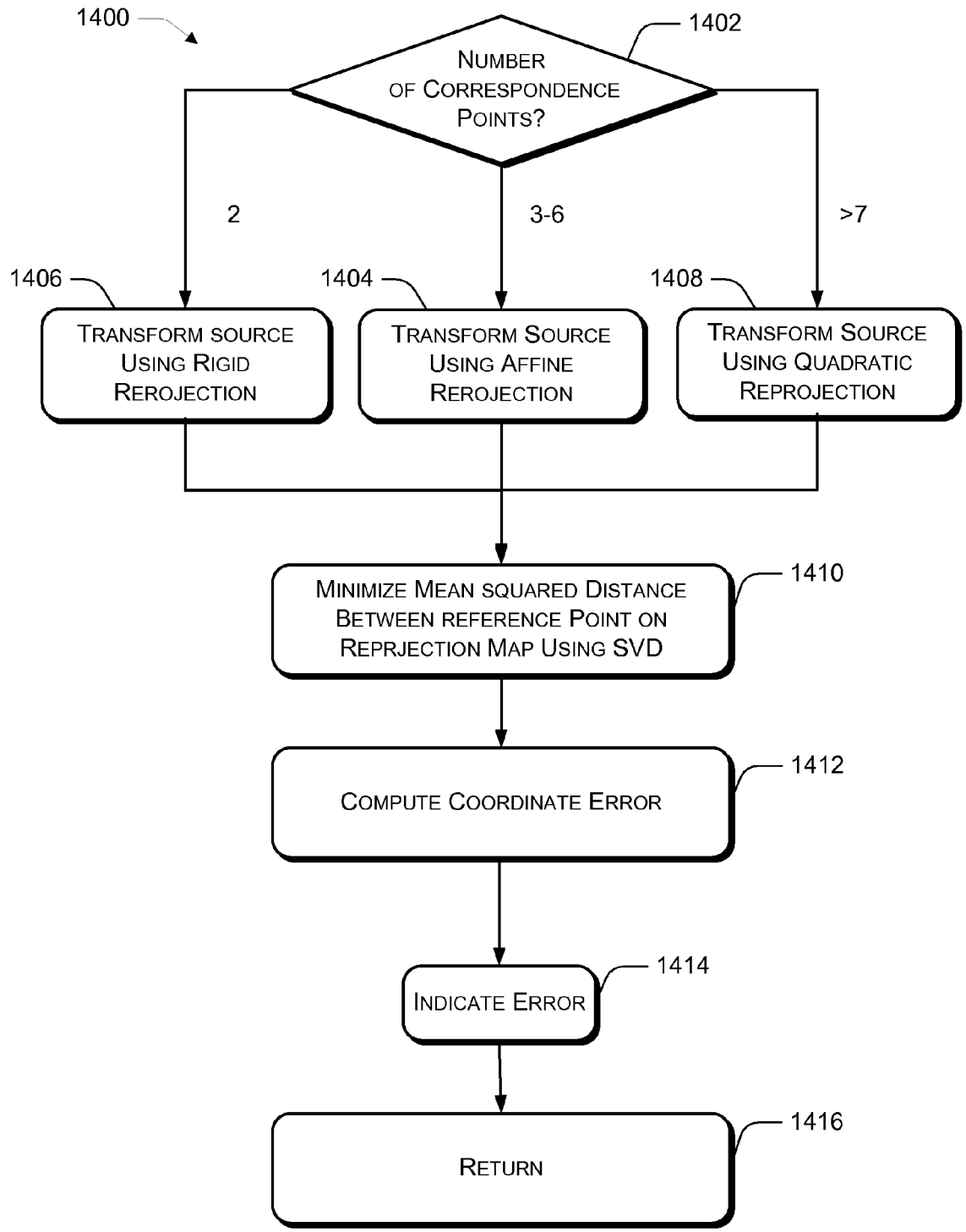
FIG. 14 illustrates an exemplary method for transforming a source image in which embodiments of the transformation system be implemented.

FIG. 14 illustrates an exemplary method 1400 for transforming a source image in which embodiments of the transformation system be implemented. FIG. 14 is described with reference to the exemplary elements shown in FIG. 1-11. At decision block 1402, the number of correspondences between the coordinates of the source map and the coordinates of the reference map automatically determines the appropriate type of reprojection process. If the number of correspondences is from 3 to 6, the source map will be transformed using affine projection at block 1404. However, if the number of correspondences is 2, the source map will be transformed using rigid reprojection at block 1406. In the case where the number of correspondences is greater than or equal to 7, the source map will be transformed using quadratic projection at block 1408. Once the source map is transformed at one of the blocks 1404, 1406 and 1408, respectively, the method then proceeds to block 1410. At block 1410, the mean squared distance between the reprojected correspondence points and the reference points is minimized using a fitting procedure that employs linear regression or singular value decomposition (SVD).

At block 1412, the method 1400 computes an amount of correspondence error between the coordinates of the source map and the coordinates of the reference map. For example, a user may accidentally establish a correspondence between points on the source and reference maps that do not actually correspond. A common instance is an "off-by-one-block" error. Nevertheless, the reprojection process will dutifully attempt to distort the source map to satisfy the erroneous correspondence. If the user has established more correspondences than necessary such that the reprojection parameters are over-constrained, the least-squares fit will be unable to satisfactorily fit all of the constraints it has been given. Specifically, for a given correspondence pair $(A_s, A_r)$, the output of the reprojection function on $A_r$ will disagree with $A_s$. In cases when most correspondences are entered correctly but only one or two are entered incorrectly, the reprojection will mostly respect the majority.

Therefore, once a computation is made as to an amount of error in the correspondence between the coordinates of the source map and the coordinates of the reference map, the coordinates are sorted by the severity of the error in descending order. The user may review the list and decide whether do anything about the errors. The degree of disagreement between the reprojected point $P(A_r)$ and the user-indicated point $A_s$ may be used to provide an indication to the user of which point is amiss at block 1414.

In order to provide such an indication, the magnitude of disagreement for each correspondence is computed. Disagreements may be computed using inverted mapping.

Once the magnitude of the disagreement for each correspondence is computed, the correspondences may be sorted by decreasing disagreement. Finally, the sorted list, along with the observed disagreement, is presented to a user. The observed amount of disagreement provides the user with a quick suggestion of which some correspondence might be in error. The user may re-examine the top few "suspicious" correspondences in the sorted list. In an additional embodiment, as an additional aid to the user, the invention plots each $P(A_r)$ on the source map and draws a vector between $A_s$ and $P(A_r)$. For example, if the vector points south, it may suggest to the user that "perhaps the point belongs somewhere over there."

Inverted Mappings

If an exact projection function is available, its exact inverse may be used. If an affine re-projection is in use, it may be inverted in the ordinary fashion using matrix inversion.

There may be no simple procedure for inverting the two-variable quadratic mapping. However, a second bivariate quadratic transformation can be computed that approximates the inverse transformation. This can be done by swapping the roles of source and reference coordinates and fitting a projection in the inverse direction. This inverse, used with a conservative margin, is often adequate for selecting the tiles that cover the extent of a source map.

The inverted mapping may be used elsewhere in a user interface application, such as in the "Error display" described below, and often requires a more accurate inverse. A greater accuracy can be obtained by computing successively more accurate estimations using an iterative method, which is a well-known approach. In outline, given a projection P that maps each point u to point v, and given a particular value of v for which one wants to find corresponding point u, the following procedure may be implemented: First a starting estimate $u_0$ is chosen; next $v_0=P(u_0)$ is computed, the error vector between $v_0$ and v is calculated; a new estimate $u_1$ based on the calculated error is select; and this process is repeated until the process converges to the desired numerical accuracy. Many techniques for updating the estimate based on the error are described in the mathematical literature of the field of numerical methods. For most well-conditioned re-projection functions, an inverse converges rapidly on a result with error near the precision of the hardware floating-point arithmetic. Sometimes, due to user error or source maps that obey no mathematical projection, the re-projection function is ill-conditioned, and the numerical inverse diverges, producing no sensible output after many iterations. In those cases, the application terminates and uses the approximate inverse described in the preceding paragraph. In the case of ill-conditioned functions, the inverse is not well related to the forward function, but at least the application can continue operating.

Iterative numerical methods can benefit from knowledge of an initial seed that provides a starting estimate of the output value and a neighborhood radius that estimates the difference between the starting value and the final result. Starting in the right place and jumping reasonable distances helps ensure that the numerical method stays in the well-behaved region of the function being inverted, and thus makes the method less likely to diverge.

The disclosed embodiment computes a starting estimate and neighborhood radius by making use of the approximate inverse that (as described above) was computed as a least-squares fit to a bivariate quadratic transformation in the inverse direction. In particular, if P is the original projection and RP is the least-squares approximate inverse, the starting estimate would be $u_0=RP(v)$, and the neighborhood radius would be $r=|P(u_0)-v|$.

Exemplary Method for Tiling

Figure 15:
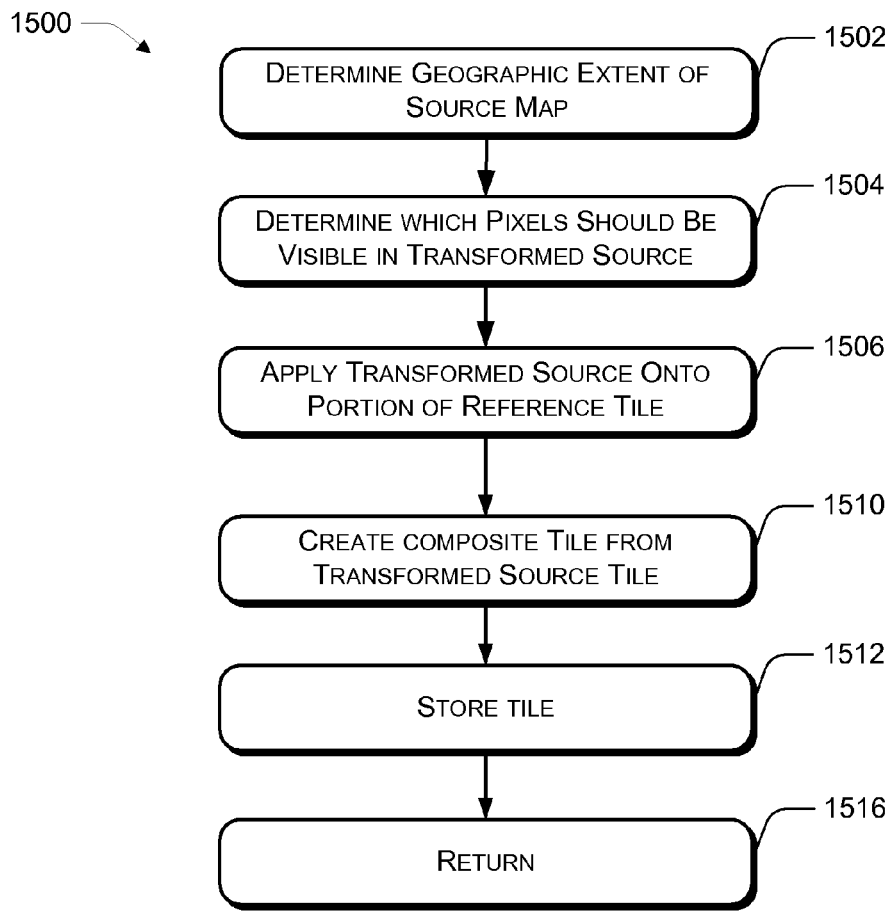
FIG. 15 illustrates an exemplary method for tiling a projected source map on a reference map in which embodiments of the transformation system be implemented.

FIG. 15 illustrates an exemplary method 1500 for tiling a projected source map on a reference map in which embodiments of the transformation system may be implemented. Individual blocks may be deleted from the method without departing from the spirit and scope of the subject matter described herein.

At block 1502, the geographic extent of the source map is determined. As described above, in one embodiment, this may be accomplished by applying the inverse of the reprojection function to the boundaries of the source map. The inverse function maps from source map coordinates to reference map coordinates to produces a boundary in reference coordinates that corresponds to the boundary of the source map. The points on the reference boundary are then converted into tile coordinates to select the set of tiles that contain the entire re-projected source image.

At block 1504, the pixels that should be visible in the transformed source map is determined. An embodiment of this determination step is fully illustrated in FIG. 8. At block 1506, the transformed source map is applied onto the corresponding portion of the reference tile. In one embodiment described above, for each output pixel in the reference tile, the output coordinate is transformed from tile image coordinates to image coordinates in the source map sample, and a color is sampled from that pixel in the sample image. This color determines the color of the pixel in the reference tile.

At block 1510, composite tiles are created from a transformed source tile. At block 1512, the composite tile is stored for later retrieval. The method 1500 may proceed directly from block 1512 to block 1516. At block 1516, the method 1500 returns to block 1210 of the exemplary method 1200.

Exemplary Computer Environment

Figure 16:
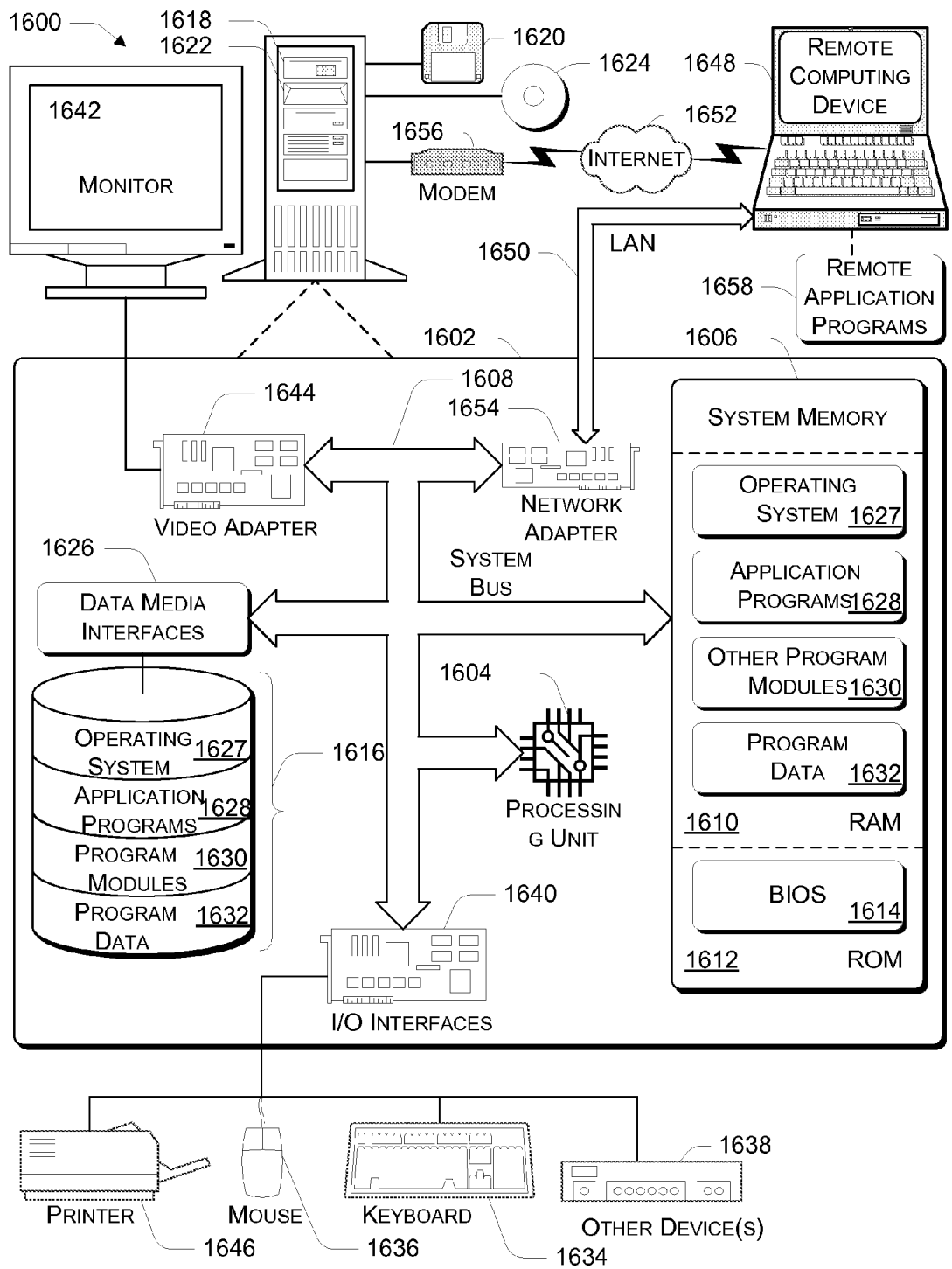
FIG. 16 illustrates an exemplary general computer environment in which embodiments of the transformation system can be implemented.

FIG. 16 illustrates an example general computer environment 1600, which can be used to implement the techniques described herein, and which may be representative, in whole or in part, of elements described herein. The computer environment 1600 is only one example of a computing environment and is not intended to suggest any limitation as to the scope of use or functionality of the computer and network architectures. Neither should the computer environment 1600 be interpreted as having any dependency or requirement relating to any one or combination of components illustrated in the example computer environment 1600.

Computer environment 1600 includes a general-purpose computing device in the form of a computer 1602, which may include client 100 or server 106. Computer 1602 can be, for example, a desktop computer, a handheld computer, a notebook or laptop computer, portable device assistant (PDA), cell phone, a server computer, a game console, and so on. The components of computer 1602 can include, but are not limited to, one or more processors or processing units 1604, a system memory 1606, and a system bus 1608 that couples various system components including the processor 1604 to the system memory 1606.

The system bus 1608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 1602 typically includes a variety of computer readable media. Such media can be any available media that is accessible by the computer 1602 and includes both volatile and non-volatile media, removable and non-removable media.

The system memory 1606 includes computer readable media in the form of volatile memory, such as random access memory (RAM) 1610, and/or non-volatile memory, such as read only memory (ROM) 1612. A basic input/output system (BIOS) 1614, containing the basic routines that help to transfer information between elements within the computer 1602, such as during start-up, is stored in ROM 1612. RAM 1610 typically contains data and/or program modules that are immediately accessible to and/or presently operated on by the processing unit 1604.

The computer 1602 may also include other removable/non-removable, volatile/non-volatile computer storage media. By way of example, FIG. 16 illustrates a hard disk drive 1616 for reading from and writing to a non-removable, non-volatile magnetic media (not shown), a magnetic disk drive 1618 for reading from and writing to a removable, non-volatile magnetic disk 1620 (e.g., a "floppy disk"), and an optical disk drive 1622 for reading from and/or writing to a removable, non-volatile optical disk 1624 such as a CD-ROM, DVD-ROM, or other optical media. The hard disk drive 1616, magnetic disk drive 1618, and optical disk drive 1622 are each connected to the system bus 1608 by one or more data media interfaces 1626. Alternatively, the hard disk drive 1616, magnetic disk drive 1618, and optical disk drive 1622 can be connected to the system bus 1608 by one or more interfaces (not shown).

The disk drives and their associated computer-readable media provide non-volatile storage of computer readable instructions, data structures, program modules, and other data for the computer 1602. Although the example illustrates a hard disk 1616, a removable magnetic disk 1620, and a removable optical disk 1624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1616, the magnetic disk 1620, the optical disk 1624, ROM 1612, and/or RAM 1610, including by way of example, an operating system 1627, one or more application programs 1628, other program modules 1630, and program data 1632. Each of such operating system 1627, one or more application programs 1628, other program modules 1630, and program data 1632 (or some combination thereof) may implement all or part of the resident components that support the distributed file system.

A user can enter commands and information into computer 1602 via input devices such as a keyboard 1634 and a pointing device 1636 (e.g., a "mouse"). Other input devices 1638 (not shown specifically) may include a microphone, joystick, game pad, satellite dish, serial port, scanner, and/or the like. These and other input devices are connected to the processing unit 1604 via the input/output interfaces 1640 that are coupled to the system bus 1608, but may be connected by other interface and bus structures, such as a parallel port, game port, or a universal serial bus (USB).

A monitor 1642 or other type of display device can also be connected to the system bus 1608 via an interface, such as a video adapter 1644. In addition to the monitor 1642, other output peripheral devices can include components such as speakers (not shown) and a printer 1646 which can be connected to computer 1602 via the input/output interfaces 1640.

The computer 1602 can operate in a networked environment using logical connections to one or more remote computers, such as a remote computing device 1648. By way of example, the remote computing device 1648 can be a personal computer, portable computer, a server, a router, a network computer, a peer device or other common network node, and the like. The remote computing device 1648 is illustrated as a portable computer that can include many or all of the elements and features described herein relative to the computer 1602.

Logical connections between the computer 1602 and the remote computer 1648 are depicted as a local area network (LAN) 1650 and a general wide area network (WAN) 1652. Such networking environments are commonplace in offices, enterprise-wide computer networks, intranets, and the Internet.

When implemented in a LAN networking environment, the computer 1602 is connected to a local network 1650 via a network interface or adapter 1654. When implemented in a WAN networking environment, the computer 1602 typically includes a modem 1656 or other means for establishing communications over the wide network 1652. The modem 1656, which can be internal or external to the computer 1602, can be connected to the system bus 1608 via the input/output interfaces 1640 or other appropriate mechanisms. It is to be appreciated that the illustrated network connections are exemplary and that other means of establishing communication link(s) between the computers 1602 and 1648 can be employed.

In a networked environment, such as that illustrated with computing environment 1600, program modules depicted relative to the computer 1602, or portions thereof, may be stored in a remote memory storage device. By way of example, remote application programs 1658 reside on a memory device of remote computer 1648. For purposes of illustration, application programs and other executable program components such as the operating system are illustrated herein as discrete blocks, although it is recognized that such programs and components reside at various times in different storage components of the computing device 1602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) can be designed or programmed to implement one or more portions of the framework.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:
1. A computer implemented method comprising:
providing, on a transformation device, an interface that enables identification of geo-coordinates on a source map that correspond with known geo-coordinates on a pre-existing online reference map, the interface including two viewing panes, a source pane to display the source map, and a reference pane to display the online reference map;
using the identified geo-coordinates to determine an approximate coordinate transform relating to geo-coordinate relationships between geo-coordinates on the source map and geo-coordinates on the online reference map, the online reference map having images formed by a plurality of tiles; and
using the approximate coordinate transform to transform an image of the source map to form an image of a modified source map having geo-coordinates that substantially align with corresponding geo-coordinates on the online reference map, wherein:
the image of the source map is transformed using a reprojection function that is automatically selected based on a number of correspondence points established between the source map and the online reference map, and
an affine reprojection function is automatically selected when at least two correspondence points are established.

2. The method as recited in claim 1 further comprising:
forming one or more modified source tiles with the image of the modified source map, the formed modified source tiles having geo-coordinates that align with geo-coordinates of two or more of the tiles that form the images of the reference map; and
displaying images of a portion of the reference map with the formed modified source tiles.

3. The method of claim 1 wherein the approximate coordinate transform is determined using linear regression by singular-value decomposition.

4. The method of claim 1 further comprising projecting coordinates from the reference map to the source map to determine a location of tile boundaries in the source map.

5. The method of claim 1 further comprising:
simultaneously displaying the source map and the reference map; and
relating views of the source map and the reference map such that when a geo-coordinate of one of the maps is viewed, a corresponding geo-coordinate on the other map is displayed.

6. The method as recited in claim 1, wherein the geo-coordinate relationships are determined by indicating a geo-coordinate on the source map and indicating a corresponding geo-coordinate on the reference map; and further comprising displaying a correspondence disagreement that suggests where indicated corresponding geo-coordinates may be in error.

7. The method as recited in claim 6, wherein the displayed correspondence disagreement is determined by at least one of:
sorting correspondences by decreasing disagreement,
computing distance values, or
determining graphical vector representations between coordinates on the reference map and the source map.

8. The method as recited in claim 1, wherein each of the plurality of tiles of the images of the modified source map comprise a plurality of pixels, and wherein each of the tiles of the images of the modified source map are formed by:
determining a corresponding area in the source map that covers an image region that defines the tile in the online reference map;
transforming coordinates of the image of the source map within the corresponding area; and
selecting visibility and color for each pixel of at least one of the tiles for the modified source map based on the corresponding location within the transforming coordinates of the image of the source map.

9. The method as recited in claim 1 further comprising determining geo-coordinate relationships between geo-coordinates on a second source map and geo-coordinates on the online reference map; and automatically compositing the first and second source maps together to form a single rendered tile map at points of overlapping geo-coordinates.

10. The method as recited in claim 1, further comprising:
determining second geo-coordinate relationships between geo-coordinates on a second source map and geo-coordinates on the source map;
using the second geo-coordinate relationships to transform an image of the second source map to form a modified second source map having geo-coordinates that substantially align with corresponding geo-coordinates on the modified source map; and
forming tiles with the modified second source map, the tiles having geo-coordinates that substantially align with geo-coordinates for corresponding tiles in the online reference map, wherein:
the image of the second source map is transformed using a second reprojection function that is automatically selected based on a second number of correspondence points established between the second source map and the online reference map,
an affine reprojection function is automatically selected when the second number of correspondence points is not greater than six, and
a quadratic reprojection function is automatically selected when the second number of correspondence points is not less than seven.

11. The method as recited in claim 1, further comprising:
displaying an image of the modified reference map; and
displaying an interactively editable boundary of the source map to enable users to select which portions of the source map are to be transformed.

12. A computer storage device including instructions which when executed by a processor comprise:
enabling, with a user interface, a user to identify correspondences between locations on a source map and locations on a preexisting online reference map;
determining geo-coordinate relationships between locations on the source map and the locations on the preexisting online reference map, the preexisting online reference map having images being formed by a plurality of tiles;
using the geo-coordinate relationships to transform an image of the source map into an image of a modified source map having locations that substantially align with corresponding locations on the preexisting online reference map;
forming one or more modified source tiles with the image of the modified source map, the formed modified source tiles having locations that align with locations of some of the tiles that form the images of the preexisting online reference map; and
wherein the image of the source map is transformed using a quadratic reprojection calculated using:

$$s_x = c_{00} r_x^2 + c_{01} r_x r_y + c_{02} r_x + c_{03} r_y^2 + c_{04} r_y + c_{05}$$

$$s_x = c_{10} r_x^2 + c_{11} r_x r_y + c_{12} r_x + c_{13} r_y^2 + c_{14} r_y + c_{15}.$$

13. The computer storage device as recited in claim 12, further comprising providing images of a portion of the preexisting online reference map with the formed modified source tiles.

14. The computer storage device instructions as recited in claim 12, further comprising determining the relationship by selecting correspondence points between the source map and the preexisting online reference map; and wherein the function for transforming the image is selected automatically based on a number of correspondence points established between the reference map and the source map.

15. A computer system comprising:
a user interface configured for display on a computer display to enable identification of correspondences between geo-coordinates on a source map and geo-coordinates on an online reference map, the user interface including one or more panes, the one or more panes configured to display the source map and the online reference map and enable panning and/or zooming each map to arbitrary locations independently;
a determination module for determining geo-coordinate relationships between the geo-coordinates on the source map and geo-coordinates on the online reference map, said online reference map having images formed by a plurality of tiles;

a transformation module to use the geo-coordinate relationships to transform an image of the source map into an image of a modified source map having geo-coordinates that substantially align with corresponding geo-coordinates on the online reference map, wherein the transformation module automatically selects a reprojection function based on a number of correspondence points established between the source map and the online reference map, wherein:
  an affine reprojection function is automatically selected when at least two correspondence points are established, and
  a quadratic reprojection function is automatically selected when at least six correspondence points are established; and
a formation module to form one or more modified source tiles with the image of the modified source map, the formed modified source tiles having geo-coordinates that substantially align with geo-coordinates of some of the tiles that form the images of the online reference map.

16. The computer system as recited in claim 15, further comprising an output module to indicate images of a portion of the online reference map with the formed modified source tiles.

17. The computer system as recited in claim 15, wherein each of the plurality of tiles of the images of the modified source map comprise a plurality of pixels, and wherein the formation module comprises:
  a detection module to determine a corresponding area in the source map that covers an image region that defines one of the tiles forming the image in the online reference map;
  wherein the transformation module transforms coordinates of the image of the source map within the corresponding area; and
  a selection module to select visibility and color for each pixel of at least one of the tiles for the modified source map based on the corresponding location within the transforming coordinates of the image of the source map.

18. The computer system as recited in claim 15, wherein:
the determination module determines geo-coordinate relationships between geo-coordinates on a second source map and geo-coordinates on the online reference map; and
the determination module automatically composites the first and second source maps together to form a single rendered tile map at points of overlapping geo-coordinates.

19. The computer system as recited in claim 15, wherein:
the determination module determines second geo-coordinate relationships between geo-coordinates on a second source map and geo-coordinates on the modified source map,
the determination module use the second geo-coordinate relationships to transform an image of the second source map to form a modified second source map having geo-coordinates that substantially align with corresponding geo-coordinates on the modified source map; and
the formation module forms tiles with the modified second source map, the tiles having geo-coordinates that substantially align with geo-coordinates for corresponding tiles in the online reference map.

20. The computer system of claim 15, wherein:
the affine reprojection function is automatically selected when the number of correspondence points is not greater than six, and
the quadratic reprojection function is automatically selected when the number of correspondence points is not less than seven.

* * * * *